United States Patent
Takeuchi et al.

(10) Patent No.: US 12,350,749 B2
(45) Date of Patent: Jul. 8, 2025

(54) GEAR MACHINING APPARATUS

(71) Applicant: JTEKT CORPORATION, Osaka (JP)

(72) Inventors: Kento Takeuchi, Kariya (JP); Hisashi Otani, Anjo (JP); Hiroyuki Nakano, Tokai (JP); Shuntaro Takasu, Hekinan (JP); Yoshitaro Ohsaki, Nukata-gun (JP); Tetsuro Furuhata, Nagoya (JP); Kazunari Ogura, Tsushima (JP)

(73) Assignee: JTEKT CORPORATION, Osaka (JP)

( * ) Notice: Subject to any disclaimer, the term of this patent is extended or adjusted under 35 U.S.C. 154(b) by 1133 days.

(21) Appl. No.: 17/221,239

(22) Filed: Apr. 2, 2021

(65) Prior Publication Data
US 2021/0331261 A1 Oct. 28, 2021

(30) Foreign Application Priority Data

Apr. 23, 2020 (JP) .................. 2020-076694
Jun. 19, 2020 (JP) .................. 2020-105739

(51) Int. Cl.
  *B23F 5/20* (2006.01)
  *B23F 21/16* (2006.01)
  *B23F 23/00* (2006.01)

(52) U.S. Cl.
  CPC ............... *B23F 5/20* (2013.01); *B23F 21/16* (2013.01); *B23F 23/006* (2013.01)

(58) Field of Classification Search
  USPC ........................................................ 700/159
  See application file for complete search history.

(56) References Cited

U.S. PATENT DOCUMENTS

| 657,447 | A | | 4/1987 | Faulstich et al. |
| 4,657,447 | A | * | 4/1987 | Faulstich ............... B23F 23/12 409/12 |
| 4,663,721 | A | * | 5/1987 | Herscovici ......... G05B 19/4163 408/11 |

(Continued)

FOREIGN PATENT DOCUMENTS

| CN | 102481648 A | | 5/2012 |
| CN | 103376773 A | * | 10/2013 |

(Continued)

OTHER PUBLICATIONS

Japanese Office Action issued Jan. 9, 2024 in Japanese Patent Application No. 2020-076694 (with unedited computer-generated English translation), 6 pages.

(Continued)

*Primary Examiner* — Hien D Khuu
(74) *Attorney, Agent, or Firm* — Oblon, McClelland, Maier & Neustadt, L.L.P.

(57) ABSTRACT

To provide a gear machining apparatus capable of correcting a tooth trace error without using a special tool when a hob cutter is cantilever-supported. A gear machining apparatus includes a hob cutter machining a tooth profile on a workpiece, a tool spindle device rotatably cantilever-supporting the hob cutter, a workpiece spindle device rotatably supporting the workpiece, a driving device moving the tool spindle device and the workpiece spindle device relatively to each other, a measuring device measuring the value corresponding to a bending amount of the hob cutter or a rotation synchronization shift of the workpiece spindle device with respect to the tool spindle device and a correction processing unit correcting a cutting amount of the hob cutter T or the rotation synchronization shift of the workpiece spindle device with respect to the tool spindle device based on the value measured by the measuring device.

10 Claims, 10 Drawing Sheets

(56) References Cited

U.S. PATENT DOCUMENTS

| | | | | |
|---|---|---|---|---|
| 5,310,295 | A | * | 5/1994 | Palmateer, Jr. ........... B23F 9/10 409/13 |
| 5,904,457 | A | * | 5/1999 | Suwijn ............... G05B 19/4065 409/134 |
| 2005/0025597 | A1 | * | 2/2005 | Klingen .................... B23F 9/10 409/27 |
| 2005/0265800 | A1 | * | 12/2005 | Endo .................... G05B 19/186 409/2 |
| 2010/0063609 | A1 | * | 3/2010 | Kohring ............. G05B 19/4142 700/108 |
| 2012/0121353 | A1 | * | 5/2012 | Tsuchimochi ........ B23F 17/006 409/15 |
| 2012/0301241 | A1 | * | 11/2012 | Maruyama ................ B23F 1/04 409/38 |
| 2013/0280990 | A1 | | 10/2013 | Geiser et al. |
| 2017/0113289 | A1 | * | 4/2017 | Sobczyk .................... B23F 5/16 |
| 2018/0238419 | A1 | * | 8/2018 | Glaser ................. B23F 23/1237 |
| 2019/0217407 | A1 | * | 7/2019 | Frischtatzky ........... B23F 9/025 |
| 2020/0086409 | A1 | * | 3/2020 | Nakano ................... B23F 5/163 |
| 2021/0008653 | A1 | * | 1/2021 | Yoshinaga .......... B23F 23/1218 |

FOREIGN PATENT DOCUMENTS

| | | | |
|---|---|---|---|
| CN | 105921825 A | * | 9/2016 |
| CN | 108453320 A | | 8/2018 |
| EP | 0054838 A2 | * | 6/1982 |
| JP | 59-081017 A | | 5/1984 |
| JP | H10113801 A | * | 5/1998 |
| JP | 2004-209575 A | | 7/2004 |
| JP | 2005-231013 A | | 9/2005 |
| JP | 2010158748 A | * | 7/2010 |
| JP | 2014-184505 A | | 10/2014 |
| JP | 2015-208806 A | | 11/2015 |
| TW | 201134586 A | | 10/2011 |
| WO | WO 2011129008 A1 | * | 10/2011 |
| WO | WO 2015/146661 A1 | | 10/2015 |
| WO | WO 2016031487 A1 | * | 3/2016 |

OTHER PUBLICATIONS

Chinese Office Action issued in Chinese Patent Application No. 202110411446.3 on Apr. 25, 2025, with English Translation.

* cited by examiner

GEAR MACHINING APPARATUS

CROSS REFERENCE TO RELATED APPLICATIONS

This application claims priority based on Japanese Patent Application No. 2020-076694 filed on Apr. 23, 2020, and Japanese Patent Application No. 2020-105739 filed on Jun. 19, 2020, the entire contents of which are incorporated by reference herein.

TECHNICAL FIELD

The present invention relates to a gear machining apparatus.

BACKGROUND ART

Patent literature 1 describes the generating machining of tooth profiles on a workpiece using a hob cutter. Since the machining resistance changes as the machining of the workpiece progresses, the load with respect to the rotation of the hob cutter fluctuates. In particular, the load gradually increases in the early stage of cutting, is stable at a high value in the intermediate stage, and gradually reduces in the final stage of cutting. Accordingly, patent literature 1 describes a technique that electrically detects fluctuations in the load, calculates the correlation value between the detected signal and the tooth trace error of the workpiece, and gives the correction rotation to the workpiece support table according to the correlation value. Patent literature 1 describes that this technique can correct the tooth trace direction error of the workpiece.

In addition, patent literature 2 describes a technique that uses a machining center with an exchangeable tool instead of a dedicated hob machine, attaches a hob cutter to the tool spindle of the machining center, and machines the workpiece. In this case, since the hob cutter is cantilever-supported, the rigidity that supports the hob cutter becomes low. As a result, an error from the ideal involute tooth profile may be generated in tooth profiles formed on the workpiece. Accordingly, patent literature 2 describes a technique that performs the generating machining of tooth profiles using a correction hob cutter in which concave portions or convex portions are formed on the inclined surface of a substantially trapezoidal cutting blade.

CITATION LIST

Patent Literature

PTL 1: JPS59-81017A
PTL 2: JP2015-208806A

SUMMARY OF INVENTION

Technical Problem

By the way, it has been found that the correction as described in patent literature 1 is not sufficient to cantilever-support the hob cutter. That is, it has been found that, when the hob cutter is cantilever-supported, there is a behavior other than the behavior in which the load gradually increases in the early stage of cutting, is stable at a high value in the intermediate stage, and gradually reduces in the final stage of cutting.

In addition, the correction hob cutter as described in the patent literature 2 is a special tool, so the cost is high. Accordingly, a tooth trace error needs to be reduced without using a special tool.

An object of the present invention is to provide a gear machining apparatus capable of correcting a tooth trace error without using a special tool when a hob cutter is cantilever-supported.

Solution to Problem

A gear machining apparatus includes a hob cutter machining a tooth profile on a workpiece; a tool spindle device rotatably cantilever-supporting the hob cutter; a workpiece spindle device rotatably supporting the workpiece; a driving device moving the tool spindle device and the workpiece spindle device relatively to each other; a measuring device measuring a value corresponding to a bending amount of the hob cutter or a rotation synchronization shift of the workpiece spindle device with respect to the tool spindle device or a tooth phase of the tooth profile of the workpiece; and a correction processing unit correcting a cutting amount of the hob cutter or the rotation synchronization shift of the workpiece spindle device with respect to the tool spindle device based on the value measured by the measuring device.

The inventors et. al have found that a specific cantilever-induced operation occurs when the hob cutter is cantilever-supported. In a specific cantilever-induced operation, since the hob cutter is cantilever-supported when the generating machining of tooth profiles is performed on the workpiece, the bending amount of the hob cutter or the vibration of the hob cutter increases in the machining start end portion in the tooth profile in the tooth width direction and the bending amount of the hob cutter or the vibration of the hob cutter reduces in the middle portion in the tooth width direction. When a specific cantilever-induced operation occurs, the correction processing unit corrects the cutting amount or the rotation synchronization shift based on the value corresponding to the bending amount of the hob cutter or the rotation synchronization shift measured by the measuring device. Accordingly, the tooth trace error caused by a cantilever-induced operation specific to cantilever-support can be reduced.

DESCRIPTION OF EMBODIMENTS

1. Structure of Gear Machining Apparatus 1

A gear machining apparatus 1 will be described with reference to FIG. 1. The gear machining apparatus 1 causes a hob cutter T to perform generating machining of tooth profiles on a workpiece W by moving the hob cutter T and the workpiece W relatively to each other.

In this example, the gear machining apparatus 1 is a general-purpose machine tool, for example, a machining center. That is, the machining center is configured so that the tool thereof can be exchanged, and machining according to the installed tool can be performed. For example, exchangeable tools include a gear skiving cutter, an end mill, a milling tool, a drill, a turning tool, a threading tool, a grinding tool, and the like in addition to the hob cutter T. It should be noted here that FIG. 1 does not illustrate the tool changer and the tool magazine in which tools are stored.

In addition, in this example, the basic structure of the machining center as the gear machining apparatus 1 is a horizontal machining center. However, the gear machining apparatus 1 may be a vertical machining center having another structure.

Figure 1:
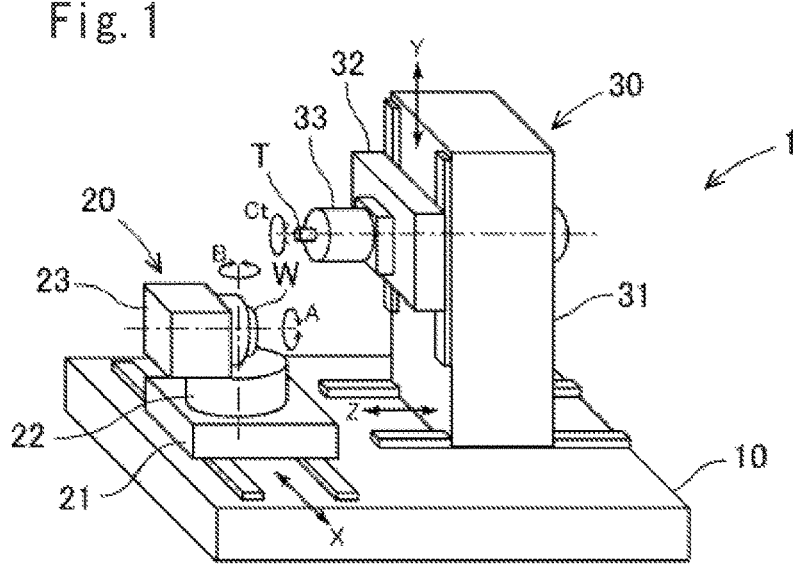
FIG. 1 is a diagram illustrating an example of a gear machining apparatus.

As illustrated in FIG. 1, the gear machining apparatus 1 has, for example, three translational axes (X-axis, Y-axis, and Z-axis) that are orthogonal to each other as drive axes. Here, the direction of the rotation axis line (identical to the rotation axis line of the tool spindle) of the hob cutter T is defined as the Z-axis direction and the directions of the two axes orthogonal to the Z-axis direction are defined as the X-axis direction and the Y-axis direction. In FIG. 1, the horizontal direction is assumed to be the X-axis direction and the vertical direction is the Y-axis direction. In addition, the gear machining apparatus 1 further has, as drive axes, two rotation axes (A-axis and B-axis) for changing the relative postures of the hob cutter T and the workpiece W. In addition, the gear machining apparatus 1 has a Ct-axis as a rotation axis for rotating the hob cutter T.

That is, the gear machining apparatus 1 is a 5-axis machine (6-axis machine when the tool spindle (Ct-axis) is considered) capable of machining a free-form surface. The gear machining apparatus 1 may have the structure in which a Cw-axis (rotation axis around the Z-axis in the reference state) and the B-axis (rotation axis around the Y-axis in the reference state) are present or the structure in which the A-axis (rotation axis around the X-axis in the reference state) and the Cw-axis are present instead of the structure in which the A-axis and the B-axis are present.

In the gear machining apparatus 1, the structure in which the hob cutter T and the workpiece W are moved relatively to each other can be selected as appropriate. In this example, the gear machining apparatus 1 allows the hob cutter T to move linearly in the Y-axis direction and the Z-axis direction, the workpiece W to move linearly in the X-axis direction, and the workpiece W to rotate about the A-axis and the B-axis. In addition, the hob cutter T can rotate about the Ct-axis.

The gear machining apparatus 1 includes a bed 10, a workpiece holding device 20, and a tool holding device 30. The bed 10 is formed in any shape such as a substantially rectangular shape and is installed on the floor surface. The workpiece holding device 20 allows the workpiece W to move linearly in the X-axis direction with respect to the bed 10 and to rotate about the A-axis and the B-axis. The workpiece holding device 20 mainly includes an X-axis moving table 21, a B-axis rotary table 22, and a workpiece spindle device 23.

The X-axis moving table 21 is provided so as to be movable in the X-axis direction with respect to the bed 10. Specifically, the bed 10 is provided with a pair of X-axis guide rails extending in the X-axis direction (front-rear direction in FIG. 1), and the X-axis moving table 21 is driven by a driving device such as a linear motor or a ball screw mechanism, which is not illustrated, and thereby reciprocates in the X-axis direction while being guided by the pair of X-axis guide rails.

The B-axis rotary table 22 is installed on the upper surface of the X-axis moving table 21 and reciprocates in the X-axis direction integrally with the X-axis moving table 21. In addition, the B-axis rotary table 22 is provided so as to be rotatable about the B-axis with respect to the X-axis moving table 21. A rotary motor (not illustrated) is housed in the B-axis rotary table 22, and the B-axis rotary table 22 becomes rotatable about the B-axis by being driven by the rotary motor.

The workpiece spindle device 23 is installed on the B-axis rotary table 22 and rotates about the B-axis integrally with the B-axis rotary table 22. The workpiece spindle device 23 supports the workpiece W so that the workpiece W is rotatable about the A-axis. In this example, the workpiece spindle device 23 cantilever-supports the workpiece W. The workpiece spindle device 23 includes a rotary motor (not illustrated) that rotates the workpiece W. In this way, the workpiece holding device 20 makes the workpiece W movable in the X-axis direction with respect to the bed 10 and rotatable about the A-axis and the B-axis.

The tool holding device 30 mainly includes a column 31, a saddle 32, and a tool spindle device 33. The column 31 is provided so as to be movable in the Z-axis direction with respect to the bed 10. Specifically, the bed 10 is provided with a pair of Z-axis guide rails extending in the Z-axis direction (left-right direction in FIG. 1) and the column 31 is driven by a driving device such as a linear motor or a ball screw mechanism, which is not illustrated, and thereby reciprocates in the Z-axis direction while being guided by the pair of Z-axis guide rails.

The saddle 32 is disposed on the side surface (left side surface in FIG. 1) of the column 31 of the workpiece W side, that is parallel to the plane orthogonal to the Z-axis direction. A pair of Y-axis guide rails extending in the Y-axis direction (vertical direction in FIG. 1) are provided on this side surface of the column 31 and the saddle 32 is driven by a driving device such as a linear motor or a ball screw mechanism, which is not illustrated, and thereby reciprocates in the Y-axis direction.

The tool spindle device 33 is installed on the saddle 32 and moves in the Y-axis direction integrally with the saddle 32. The tool spindle device 33 supports the hob cutter T so that the hob cutter T is rotatable about the Ct-axis. In this example, the tool spindle device 33 cantilever-supports the hob cutter T. The tool spindle device 33 includes a rotary motor (not illustrated) that rotates the hob cutter T. In this way, the tool holding device 30 holds the hob cutter T so that the hob cutter T is movable in the Y-axis direction and the Z-axis direction with respect to the bed 10 and rotatable about the Ct-axis.

2. Description of the Machining State of the Hob Cutter T

The state of generating machining of the tooth profiles on the workpiece W using the hob cutter T will be described with reference to FIGS. 2A to 2C and FIG. 3.

Figure 2A:
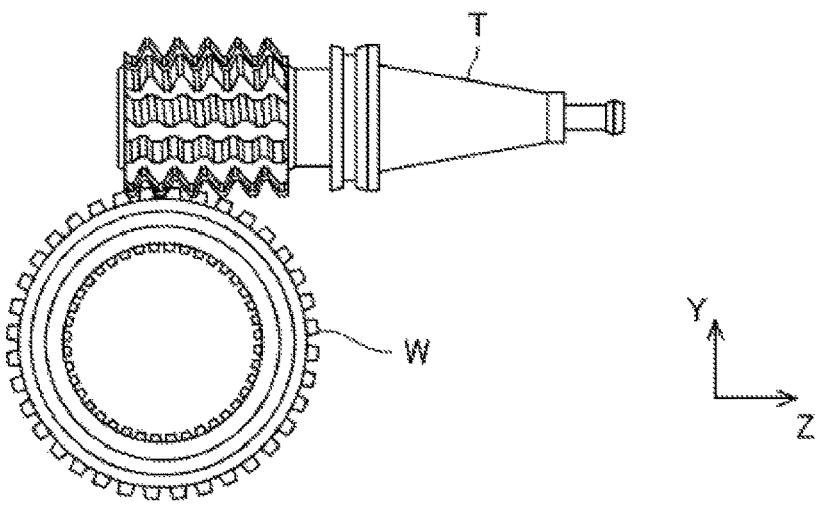
FIG. 2A is a diagram illustrating machining using the base end side of a hob cutter.
Figure 3:
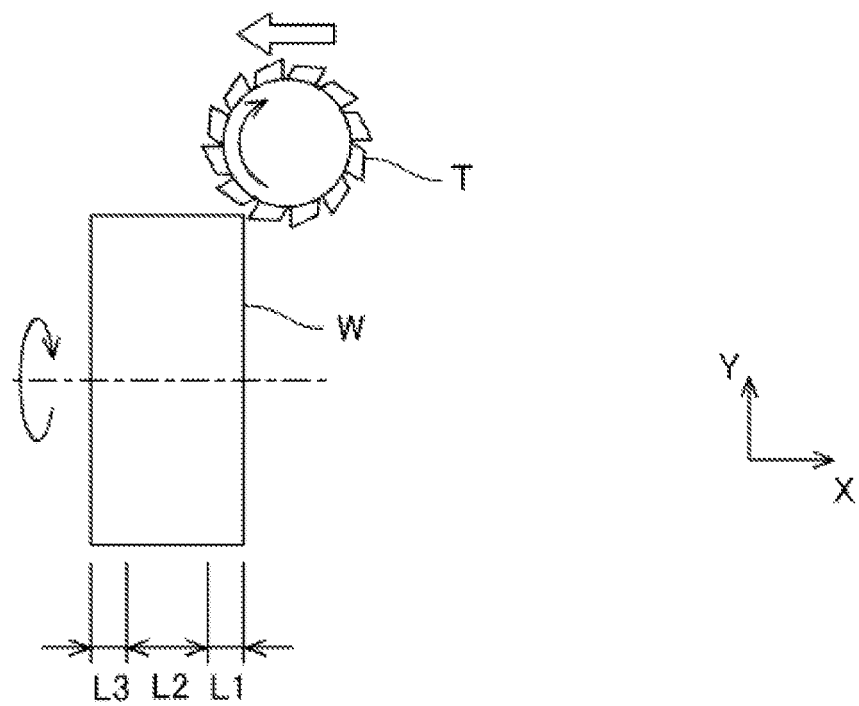
FIG. 3 is a diagram illustrating machining using the hob cutter.

As illustrated in FIG. 2A and FIG. 3, the base end side of the hob cutter T (right side in FIG. 2A) is attached to the tool spindle device 33 and the hob cutter T is cantilever-supported. In addition, the hob cutter T has a plurality of blade portions on the outer peripheral surface of the tip side (free end side). The plurality of blade portions are arranged spirally. The plurality of blade portions of the hob cutter T are arranged for a plurality of laps. That is, the hob cutter T has a plurality of blade rows in the axial direction. The number of blade rows of the hob cutter T in this example is 5 to 6 rows.

In the generating machining of tooth profiles, the intersecting angle is formed by the central axis of the hob cutter T and the central axis of the workpiece W. The intersecting angle is, for example, 90° in this example, but the intersecting angle may be an angle other than 90°. Then, while the hob cutter T is rotated about the central axis thereof and the workpiece W is rotated about the central axis thereof synchronously, the hob cutter T is relatively moved in the direction of the central axis of the workpiece W.

In this example, the hob cutter T uses the upper end of the workpiece W as the machining position. That is, the above operation is achieved by moving the hob cutter T and the workpiece W relatively to each other in the X-axis direction and the Z-axis direction with the hob cutter T positioned in the Y-axis direction. However, the machining position is not limited to the upper end of the workpiece W and may be another position in the circumferential direction of the workpiece W.

As illustrated in FIG. 2A, the number of blade rows of the hob cutter T used for one machining operation in the axial direction is two or three. That is, the hob cutter T has a number of blade rows (five or six rows) larger than the number of blade rows (two or three rows) used for one machining operation in the axial direction. Accordingly, the hob cutter T can machine the workpiece W using blade rows in different axial direction positions.

Figure 2B:
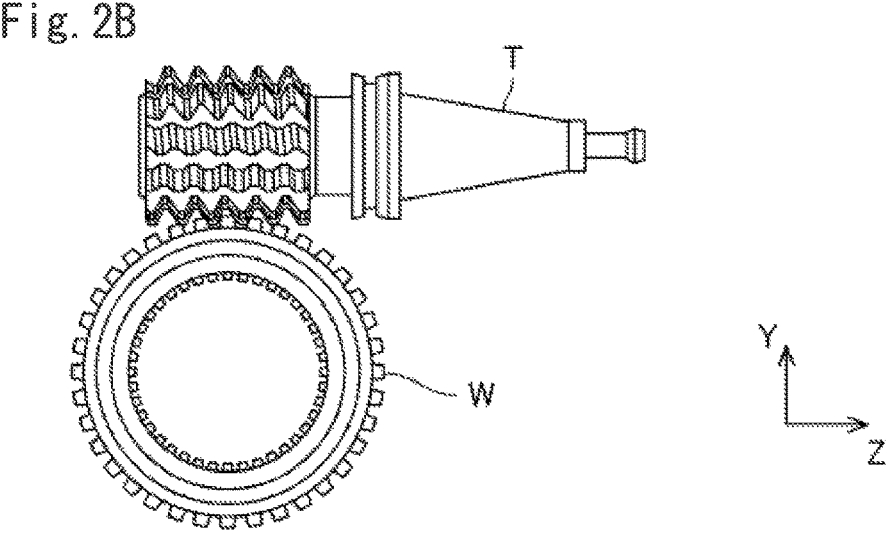
FIG. 2B is a diagram illustrating machining using the middle portion of the hob cutter.
Figure 2C:
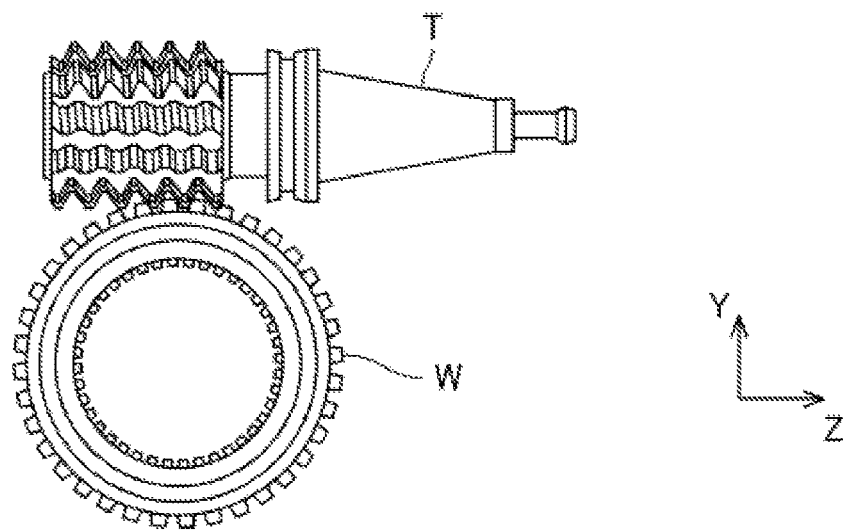
FIG. 2C is a diagram illustrating machining using the tip side of the hob cutter.

Specifically, FIG. 2A illustrates the state in which the workpiece W is machined by the blade rows on the tip side of the hob cutter T. FIG. 2B illustrates the state in which the workpiece W is machined by the blade rows in the middle portion in the axial direction of the hob cutter T. FIG. 2C illustrates the state in which the workpiece W is machined by the blade rows on the base end side of the hob cutter T. As described above, the hob cutter T can improve the life thereof by enabling the workpiece W to be machined using the blade rows in different axial direction positions.

Since the hob cutter T is cantilever-supported, the tip side of the hob cutter T is easily bent. The bending amount of the hob cutter T depends on the axial direction position used for machining in the hob cutter T. The bending amount of the hob cutter T is the largest when machining is performed using the tip side of the hob cutter T illustrated in FIG. 2A, the next largest when machining is performed using the middle portion of the hob cutter T illustrated in FIG. 2B, and the smallest when machining is performed using the base end side of the hob cutter T illustrated in FIG. 2C.

Furthermore, in the generating machining of tooth profiles, the machining load changes one after another. Accordingly, when the hob cutter T is bent in machining, the tip side of the hob cutter T vibrates in the bending direction. Then, the magnitude of vibration of the hob cutter T depends on the axial direction position of the hob cutter T used for machining. The magnitude of vibration of the hob cutter T is the largest when machining is performed using the tip side of the hob cutter T illustrated in FIG. 2A, the next largest when machining is performed using the middle portion of the hob cutter T illustrated in FIG. 2B, and the smallest when machining is performed using the base end side of the hob cutter T illustrated in FIG. 2C. That is, the larger the bending amount of the hob cutter T, the larger the magnitude of vibration.

As described above, the cantilever-support of the hob cutter T causes bending and vibration. The operation concerning bending and vibration that depend on the axial direction position of the hob cutter T used for the machining described above is referred to as a cantilever-induced operation.

3. Definition of the Machining Position of the Workpiece W

The machining position of the workpiece W will be defined with reference to FIG. 3. As illustrated in FIG. 3, when the workpiece W is machined by the hob cutter T, the generating machining of tooth profiles is performed on the workpiece W by relatively moving the hob cutter T in the central axis direction of the workpiece W while rotating the hob cutter T and synchronously rotating the workpiece W.

In this example, when the intersection angle is 90°, the hob cutter T is moved in the X-axis direction. However, when the intersection angle is tilted from 90°, the hob cutter T is moved in the direction tilted from the X-axis direction.

In FIG. 3, the hob cutter T is moved from right to left with respect to the workpiece W. Here, in the workpiece W, the machining start end portion in the tooth width direction of tooth profile is L1, the middle portion in the tooth width direction of tooth profile is L2, and the machining completion end portion in the tooth width direction of tooth profile is L3. The cantilever-induced operation described above differs between the machining start end portion L1, the middle portion L2 in the tooth width direction, and the machining completion end portion L3. Details will be described later.

4. Track of the Blade Portion of the Hob Cutter T

Figure 4A:
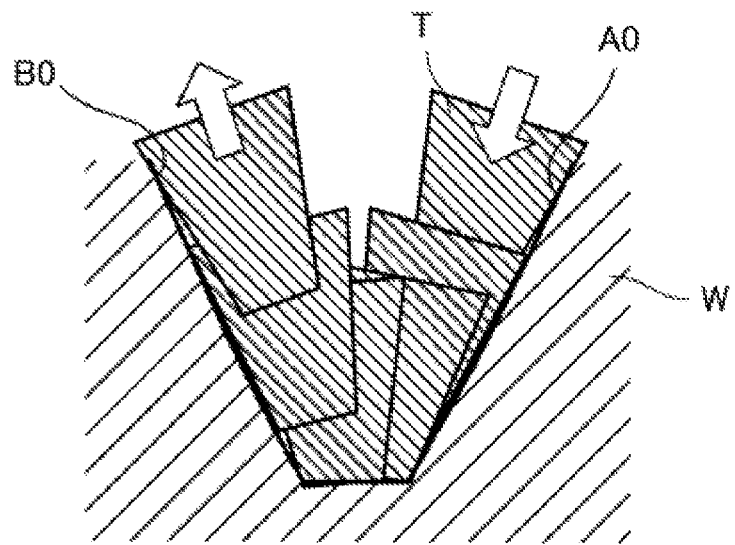
FIG. 4A is a diagram illustrating the track of the blade portion of the hob cutter on a workpiece in an ideal state.

The track of the blade portion of the hob cutter T will be described with reference to FIGS. 4A and 4B. FIG. 4A illustrates the ideal state. By moving the hob cutter T and the workpiece W relatively to each other, the blade portion of the hob cutter T is moved as illustrated by the outline arrows in FIG. 4A with respect to the workpiece W. The hob cutter T cuts in from the upper right and exits from the upper left in FIG. 4A. At this time, a tooth surface AO formed on the workpiece W is the tooth surface on the cutting start side and a tooth surface BO is the tooth surface on the cutting completion side.

However, the hob cutter T causes a cantilever-induced operation by machining as described above. That is, the hob cutter T bends and vibrates. As illustrated by the black arrow in FIG. 4B, the blade portion of the hob cutter T causes bending and vibration in machining the tooth surface on the cutting start side.

Then, the blade portion of the hob cutter T is located at a position deviated in the anti-cutting direction (left side in FIG. 4B) from the ideal tooth surface AO in machining the tooth surface (tooth surface on the right side in FIG. 4B) on the cutting start side. Accordingly, the tooth surface of the cutting start side has uncut portions as compared with the ideal tooth surface AO and has a positive tooth trace error.

Figure 4B:
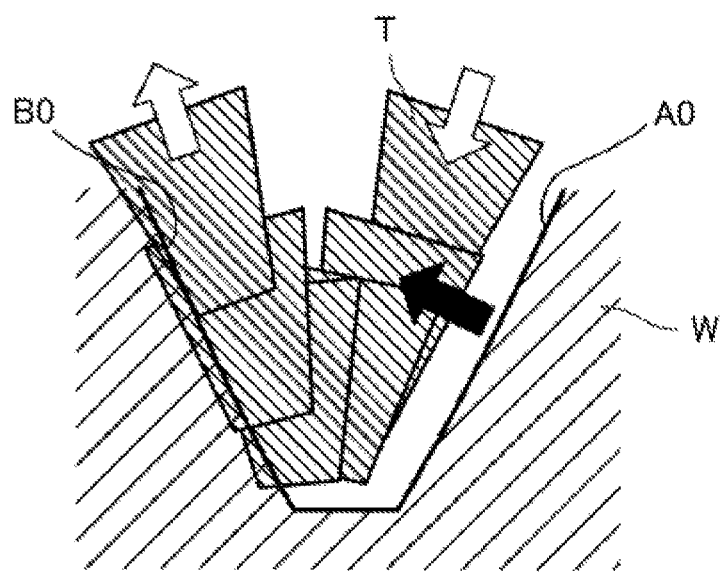
FIG. 4B is a diagram illustrating the track of the blade portion of the hob cutter on the workpiece in machining a machining start end portion.

In contrast, the blade portion of the hob cutter T is located at a position deviated in the cutting direction (left side in FIG. 4B) from the ideal tooth surface BO in machining the tooth surface on the cutting completion side (left side tooth surface in FIG. 4B). This state is reached because the hob cutter T maintains the deviation that occurs in machining the tooth surface on the cutting start side. That is, the tooth surface on the cutting completion side is cut too much as compared with the ideal tooth surface BO and has a negative tooth trace error.

Figure 5A:
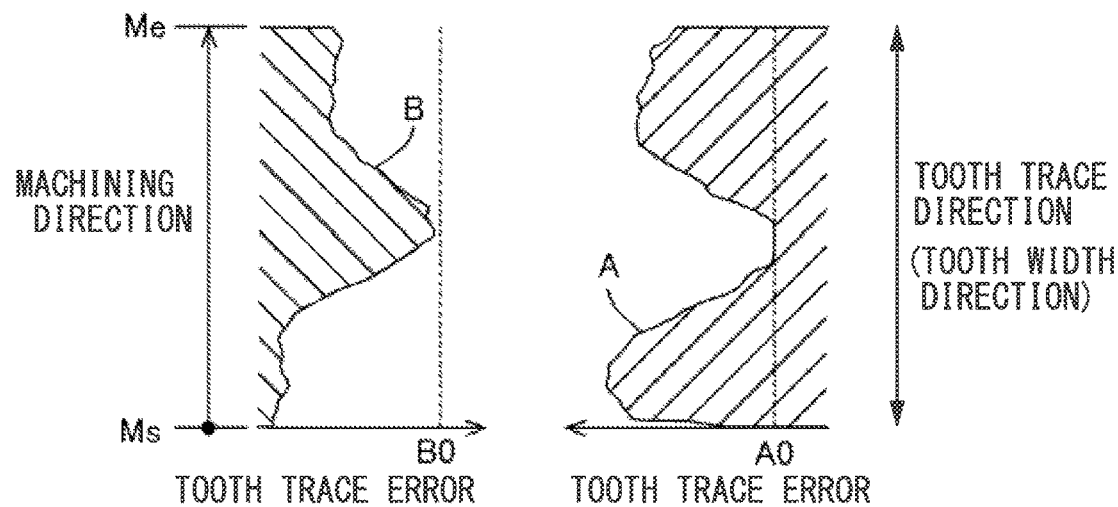
FIG. 5A is a diagram illustrating a tooth trace error in machining using the base end side of the hob cutter.
Figure 5B:
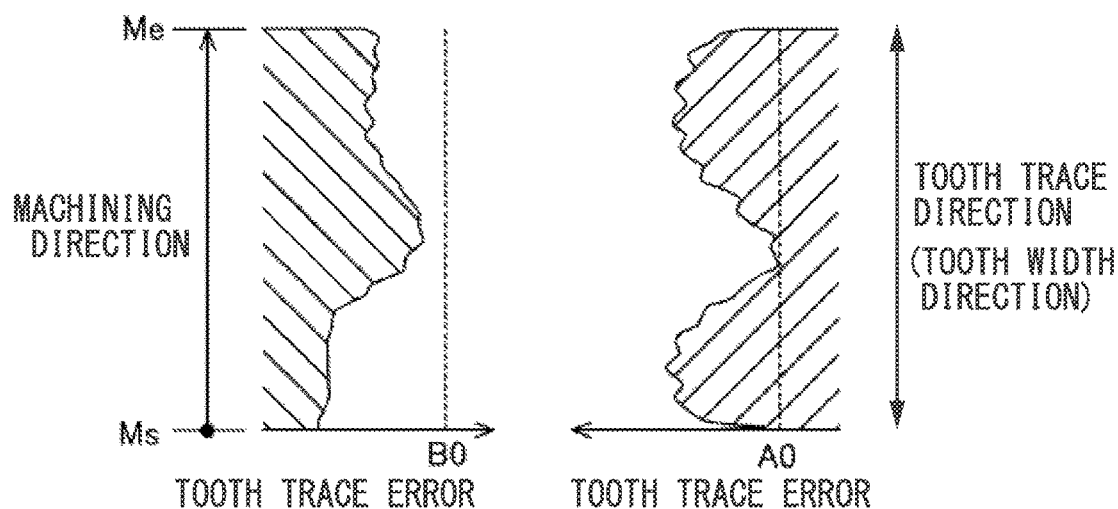
FIG. 5B is a diagram illustrating a tooth trace error in machining using the middle portion of the hob cutter.
Figure 5C:
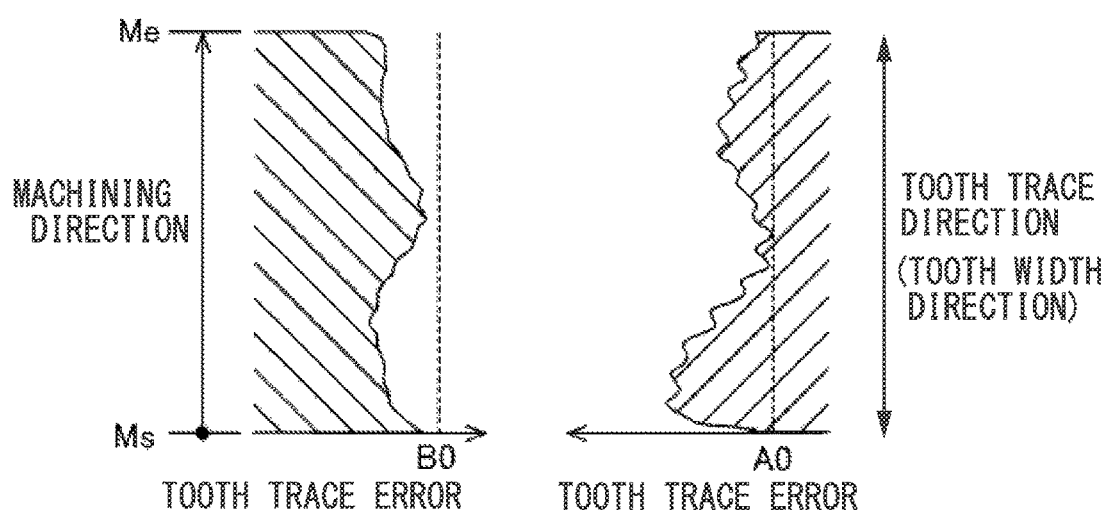
FIG. 5C is a diagram illustrating a tooth trace error in machining using the tip side of the hob cutter.

5. Machining Accuracy of the Workpiece W and the State of the Gear Machining Apparatus 1 during Machining When the machining position of the hob cutter T is set to the positions in FIG. 2A, FIG. 2B, and FIG. 2C, the machining accuracy (that is, the tooth trace error) of the workpiece W will be described with reference to FIGS. 5A, 5B, and 5C. FIGS. 5A to 5C correspond to FIGS. 2A to 2C, respectively.

In the drawing, the vertical direction is the tooth trace direction of the tooth machined in the workpiece W. In addition, in FIGS. 5A to 5C, the drawings on the right side illustrate a tooth surface A on the cutting start side on the right side in FIGS. 4A and 4B and the ideal tooth surface is indicated by A0. Here, the ideal tooth surface A0 is present at the most shaved position on the tooth surface A.

In addition, in FIGS. 5A to 5C, the drawings on the left side illustrate a tooth surface B on the cutting completion side on the left side in FIGS. 4A and 4B and the ideal tooth surface is indicated by B0. The ideal tooth surface B0 is present at the position that is based on the ideal tooth surface A0 of the tooth surface A on the cutting start side. In addition, the machining start position is Ms and the machining completion position is Me in the workpiece W. That is, in the drawing, machining proceeds from the bottom to the top.

As illustrated in FIG. 5A, when the axial direction position of the hob cutter T used for machining is the tip side, the tooth surface A on the right side has a positive tooth trace error when the machining start end portion L1 (illustrated in FIG. 3) of the workpiece W and the machining completion end portion L3 of the workpiece W are machined. That is, uncut portions are generated. The tooth surface A on the right has a slight positive tooth trace error when the middle portion L2 in the tooth width direction of the workpiece W is machined, but this tooth surface A is close to the ideal tooth surface A0.

In contrast, the tooth surface B on the left side has a negative tooth trace error in the machining start end portion L1 of the workpiece W and the machining completion end portion L3 of the workpiece W. The tooth surface B on the left side has a slight negative tooth trace error when the middle portion L2 in the tooth width direction of the workpiece W is machined, but this tooth surface B is close to the ideal tooth surface B0.

As illustrated in FIGS. 5B and 5C, when the axial direction position of the hob cutter T used for machining is the middle portion and the base end side, there is the same tendency as in the tip side. However, the magnitude of the tooth trace error is largest when the axial direction position of the hob cutter T used for machining is the tip side, the next largest when the axial direction position is the middle portion, and the smallest when the axial direction position is on the base end side. In addition, the tooth trace error when the machining start end portion L1 of the workpiece W is machined tends to be larger than the tooth trace error when the machining completion end portion L3 of the workpiece W is machined.

Figure 6A:
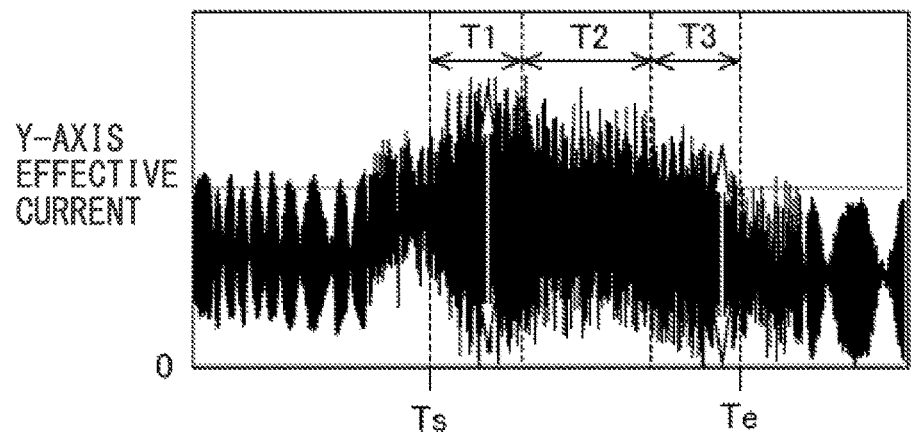
FIG. 6A is a diagram illustrating changes in a Y-axis effective current in machining using the base end side of the hob cutter.
Figure 6B:
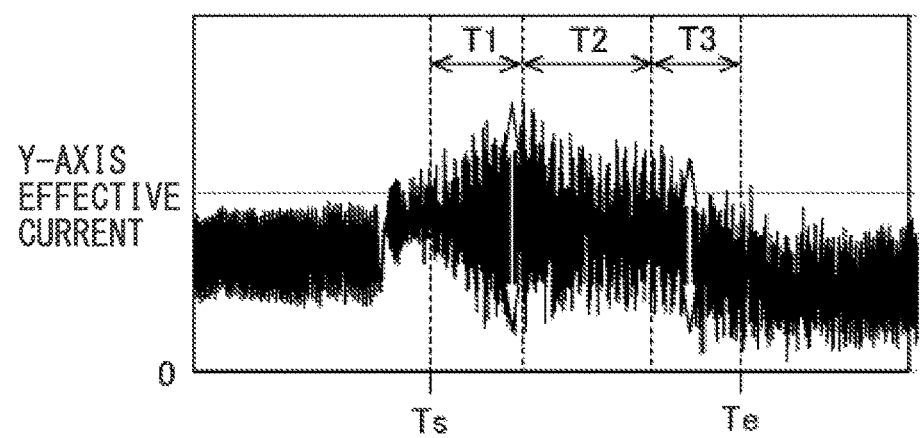
FIG. 6B is a diagram illustrating changes in the Y-axis effective current in machining using the middle portion of the hob cutter.
Figure 6C:
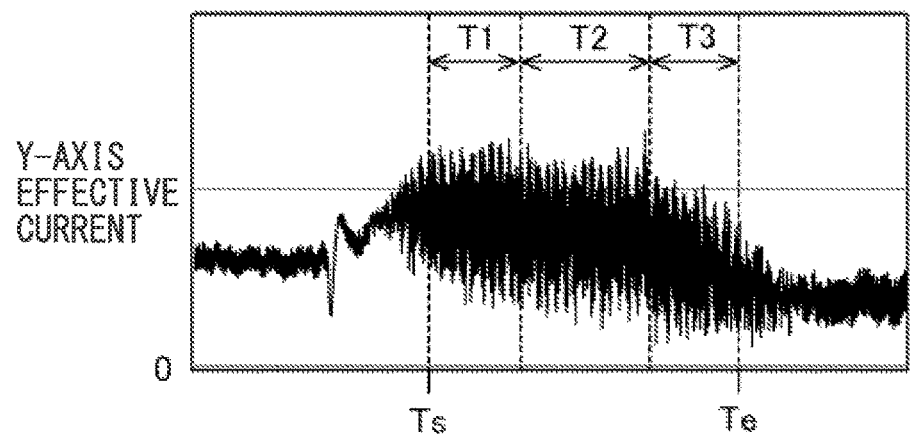
FIG. 6C is a diagram illustrating changes in the Y-axis effective current in machining using the tip side of the hob cutter.

Next, the behavior of the effective current in the Y-axis driving device, which is the driving device that moves the saddle 32 in the Y-axis direction with respect to the column 31, will be described with reference to FIGS. 6A to 6C. FIGS. 6A to 6C correspond to FIGS. 2A to 2C, respectively.

In the drawing, the machining start time is Ts and the machining completion time is Te. In addition, the time for machining the machining start end portion L1 of the workpiece W illustrated in FIG. 3 is T1, the time for machining the middle portion L2 in the tooth width direction of the workpiece W is T2, and the time for machining the machining completion end portion L3 of the workpiece W is T3.

Here, fluctuations in the Y-axis effective current correlate with the magnitude of vibration of the hob cutter T in the Y-axis direction. That is, the larger fluctuations in the Y-axis effective current, the larger the vibration of the hob cutter T in the Y-axis direction. In the expression that does not depend on the machine structure, the Y-axis effective current here is the drive current of the driving device in the direction orthogonal to the rotation centerline of the hob cutter T and corresponds to the vibration of the tool spindle device 33 in the direction orthogonal to the rotation center line of the hob cutter T.

As illustrated in FIG. 6A, when the axial direction position of the hob cutter T used for machining is the tip side, the Y-axis effective current fluctuates significantly when the machining start end portion L1 of the workpiece W is machined (time T1). In addition, the magnitude of fluctuations in the Y-axis effective current when the middle portion L2 in the tooth width direction of the workpiece W is machined (time T2) is smaller than the magnitude of fluctuations in the Y-axis effective current when the machining start end portion L1 of the workpiece W is machined. In addition, the magnitude of fluctuations in the Y-axis effective current when the machining completion end portion L3 of the workpiece W is machined (time T3) is smaller than the magnitude of fluctuations in the Y-axis effective current when the machining start end portion L1 of the workpiece W is machined, but larger than the magnitude of fluctuations in the Y-axis effective current when the middle portion L2 in the tooth width direction of the workpiece W is machined.

As illustrated in FIGS. 6B and 6C, when the axial direction position of the hob cutter T used for machining is the middle portion and the base end side, there is the same tendency as in the tip side. However, the magnitude of fluctuations in the Y-axis effective current is the largest when the axial direction position of the hob cutter T used for machining is the tip side, the next largest when the axial direction position is the middle portion, and the smallest when the axial direction position is the base end side. In addition, the magnitude of fluctuations in the Y-axis effective current when the machining start end portion L1 of the workpiece W is machined tends to be larger than the magnitude of fluctuations in the Y-axis effective current when the machining completion end portion L3 of the workpiece W is machined.

In addition, as illustrated in FIGS. 6A to 6C, the magnitude of fluctuations in the Y-axis effective current is the largest when the axial direction position of the hob cutter T illustrated in FIG. 6A is the tip side, the next largest when the axial direction position illustrated in FIG. 6B is the middle portion, and the smallest when the axial direction position illustrated in FIG. 6C is the base end side. That is, the magnitude of fluctuations in the Y-axis effective current tends to be larger toward the tip from the base end of the axial direction position.

Figure 7A:
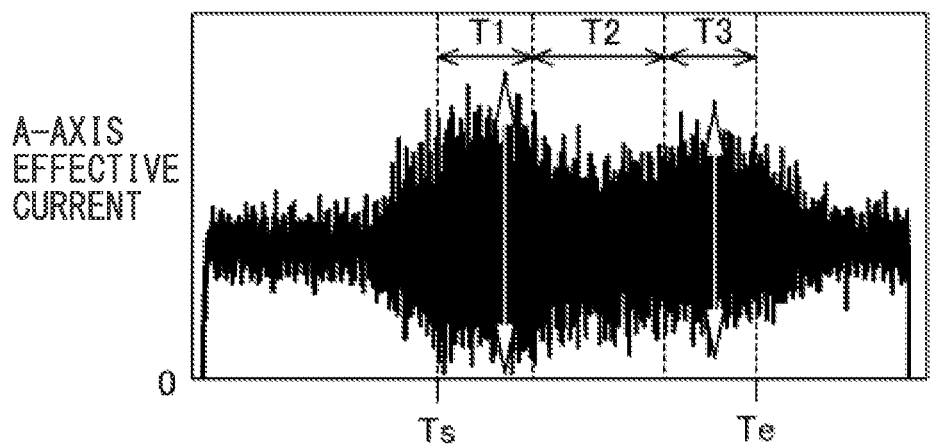
FIG. 7A is a diagram illustrating changes in an A-axis effective current in machining using the base end side of the hob cutter.
Figure 7B:
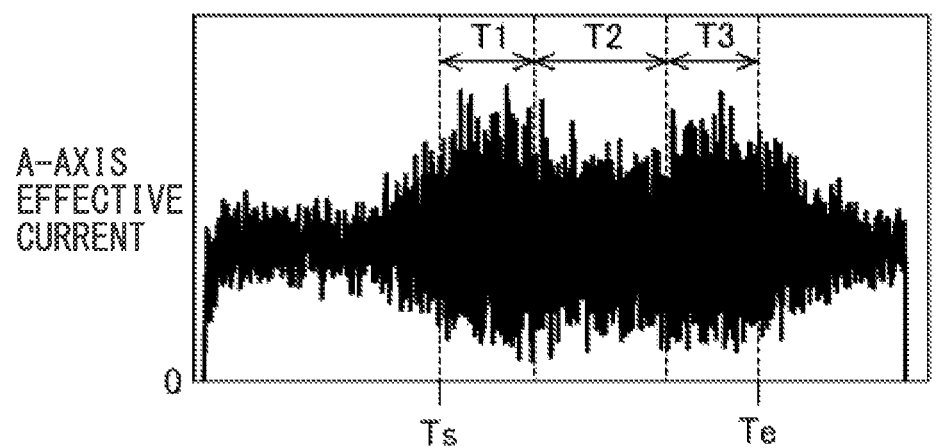
FIG. 7B is a diagram illustrating changes in the A-axis effective current in machining using the middle portion of the hob cutter.
Figure 7C:
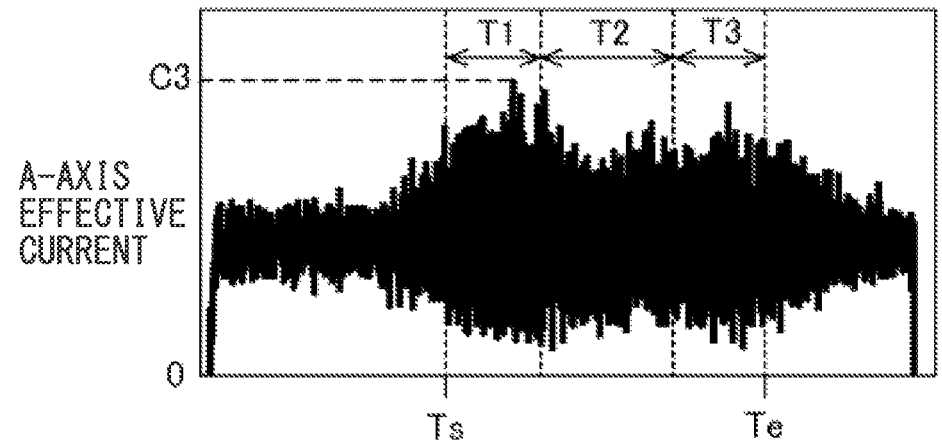
FIG. 7C is a diagram illustrating changes in the A-axis effective current in machining using the tip side of the hob cutter.

Next, the behavior of the effective current of the A-axis driving device, that is, the motor that rotationally drives the workpiece W in the workpiece spindle device 23, will be described with reference to FIGS. 7A to 7C. FIGS. 7A to 7C correspond to FIGS. 2A to 2C, respectively.

In the drawing, the machining start time is Ts and the machining completion time is Te. In addition, the time for machining the machining start end portion L1 of the workpiece W illustrated in FIG. 3 is T1, the time for machining the middle portion L2 in the tooth width direction of the workpiece W is T2, and the time for machining the machining completion end portion L3 of the workpiece W is T3.

Here, fluctuations in the A-axis effective current correlate with the shift (rotation synchronization shift) in the rotation direction of the workpiece W when the hob cutter T machines the workpiece W. That is, the larger the fluctuations in the A-axis effective current, the larger the synchronization shift between the rotation of the hob cutter T and the rotation of the workpiece W.

As illustrated in FIG. 7A, when the axial direction position of the hob cutter T used for machining is the tip side, the A-axis effective current fluctuates significantly when the machining start end portion L1 of the workpiece W is machined (time T1). In addition, the magnitude of fluctuations in the A-axis effective current when the middle portion L2 in the tooth width direction of the workpiece W is machined (time T2) is smaller than the magnitude of fluctuations in the A-axis effective current when the machining start end portion L1 of the workpiece W is machined. In addition, the magnitude of fluctuations in the A-axis effective current when the machining completion end portion L3 of the workpiece W is machined (time T3) is smaller than the magnitude of fluctuations in the A-axis effective current when the machining start end portion L1 of the workpiece W is machined, but larger than the magnitude of fluctuations in the A-axis effective current when the middle portion L2 in the tooth width direction of the workpiece W is machined.

As illustrated in FIGS. 7B and 7C, when the axial direction position of the hob cutter T used for machining is the middle portion and the base end side, there is the same tendency as in the tip side. However, the magnitude of fluctuations in the A-axis effective current is the largest when the axial direction position of the hob cutter T used for machining is the tip side, the next largest when the axial direction position is the middle portion, and the smallest when the axial direction position is the base end side. In addition, the magnitude of fluctuations in the A-axis effective current when the machining start end portion L1 of the workpiece W is machined tends to be larger than the magnitude of fluctuations in the A-axis effective current when the machining completion end portion L3 of the workpiece W is machined.

Accordingly, the tooth trace error, the magnitude of fluctuations in the Y-axis effective current, and the magnitude of fluctuations in the A-axis effective current when the machining start end portion L1 of the workpiece W is machined are larger than those when the middle portion L2 is machined. In addition, the tooth trace error, the magnitude of fluctuations in the Y-axis effective current, and the magnitude of fluctuations in the A-axis effective current when the machining completion end portion L3 of the workpiece W is machined are larger than those when the middle portion L2 is machined.

Furthermore, the tooth trace error, the magnitude of fluctuations in the Y-axis effective current, and the magnitude of fluctuations in the A-axis effective current when machining is performed using the tip side of the hob cutter T are larger than those when machining is performed using the middle portion and the base end side of the hob cutter T.

That is, the magnitude of fluctuations in the Y-axis effective current and the magnitude of fluctuations in the A-axis effective current represent the values corresponding to the tooth trace error. Then, the magnitude of fluctuations in the Y-axis effective current is the value corresponding to the bending amount of the hob cutter T, and the magnitude of fluctuations in the A-axis effective current is the value corresponding to the rotation synchronization shift of the workpiece spindle device 23 with respect to the tool spindle device 33.

6. Functional Block Structure of the Gear Machining Apparatus 1

Figure 8:
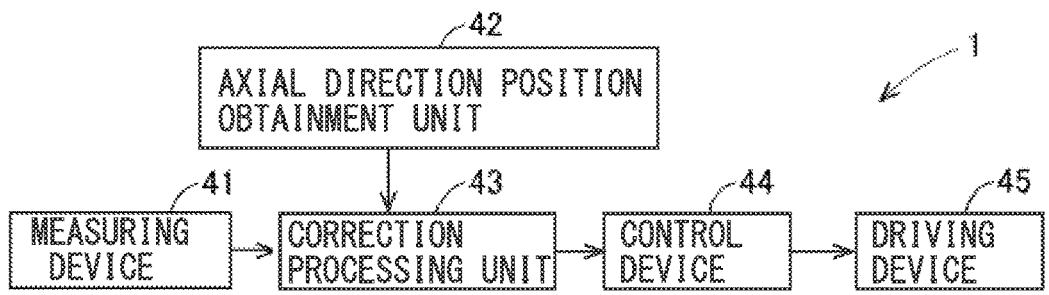
FIG. 8 is a functional block diagram illustrating the gear machining apparatus.

The functional block structure of the gear machining apparatus 1 will be described with reference to FIG. 8. An example of the mechanical structure of the gear machining apparatus 1 is illustrated in FIG. 1. Here, the functional structure of the gear machining apparatus 1 will be described.

The gear machining apparatus 1 includes at least a measuring device 41, an axial direction position obtainment unit 42, a correction processing unit 43, a control device 44, and a driving device 45. The measuring device 41 is a measuring device that measures the value corresponding to the bending amount of the hob cutter T when a cantilever-induced operation occurs, a measuring device that measures the value corresponding to the rotation synchronization shift of the workpiece spindle device 23 with respect to the tool spindle device 33, or a measuring device that measures the rotational position (that is, the tooth phase) of the tooth profile subjected to generating machining on the workpiece W.

For example, the measuring device 41 may be a sensor that measures the effective current of the Y-axis drive motor as the value corresponding to the bending amount of the hob cutter T. The measuring device 41 may also be a sensor that measures the effective current of the A-axis drive motor as the value corresponding to the rotation synchronization shift of the workpiece spindle device 23 with respect to the tool spindle device 33. Alternatively, the measuring device 41 may be a device that obtains information about the synchronization shift between the A-axis drive motor and the Ct-axis drive motor as a value corresponding to the rotation synchronization shift if the synchronization shift information can be obtained. Alternatively, the measuring device 41 may obtain the value from the rotation angle sensor of the A-axis drive motor and the value from the rotation angle sensor of the Ct-axis drive motor and thereby calculate the rotation synchronization shift using, for example, the angle difference of the motors. Alternatively, the measuring device 41 may also be a displacement sensor capable of directly measuring the bending amount of the hob cutter T. Alternatively, the measuring device 41 may be, for example, an eddy current sensor, an electromagnetic pickup, a laser sensor, or the like that measures the distances to the tooth tip surface and the tooth groove surface as values corresponding to the tooth phase of the tooth profile subjected to generating machining on the workpiece W.

Here, in this example, the bending amount and the vibration of the workpiece W are smaller than the bending amount and the vibration of the hob cutter T. Accordingly, the bending of the workpiece W does not need to be considered. However, the case in which the bending of the workpiece W is similar to that of the hob cutter T may be considered. That is, when the workpiece W is cantilever-supported, a cantilever-induced operation as in the hob cutter T occurs. In this case, in addition to the above, the measuring device 41 desirably includes a measuring device that measures the value corresponding to the bending amount of the workpiece W or a measuring device that measures the value corresponding to the rotation synchronization shift of the workpiece W.

As illustrated in FIGS. 2A to 2C, the axial direction position obtainment unit 42 obtains the axial direction position of the hob cutter T used for machining. The axial direction position can be obtained from a command value (NC program). Specifically, the axial direction position obtainment unit 42 obtains whether the axial direction position of the hob cutter T used for machining is the tip side, the middle portion, or the base end side. The axial direction position obtainment unit 42 obtain three positions (the tip side, the middle portion, the base end side) in the above description, but may obtain two positions or four or more positions. In addition, the axial direction position obtainment unit 42 may also be a position sensor of a Z-axis moving motor or a linear gauge (linear scale) capable of measuring the linear position on the Z-axis for obtaining the position. It should be noted here that the axial direction position obtainment unit 42 performs measurement of the X-axis and Y-axis similarly and obtains the positions.

The correction processing unit 43 performs correction based on the value measured by the measuring device 41 and the axial direction position of the hob cutter T used for machining obtained by the axial direction position obtainment unit 42. The correction processing unit 43 may, for example, correct the cutting amount by the hob cutter T or may correct the rotation synchronization shift of the workpiece spindle device 23 with respect to the tool spindle device 33. Furthermore, when generating machining of a plurality of tooth profiles is performed on the workpiece W, the correction processing unit 43 may correct the shift of the tooth phase of the correction target tooth profile of the plurality of tooth profiles with respect to the tooth phase of the reference tooth profile of the plurality of tooth profiles.

The correction processing unit 43 needs to determine the cutting amount or the rotation synchronization shift as the correction amount. The correction amount can be determined using a map, indicating the relationship between the measurement result of the measuring device 41 and the correction amount, that has been created based on the past result.

Alternatively, the correction amount can also be determined using machine learning. In this case, a trained model that represents the relationship between the measurement result and the correction amount is generated using machine learning in the learning phase, and the correction amount is determined using the trained model and the value measured by the measuring device 41 in the inference phase.

The correction amount is determined so as to reduce the tooth trace error of the workpiece W. For example, the correction amount is desirably determined so as to change the position in the tooth width direction of the hob cutter T in the machining start end portion L1 and the machining completion end portion L3. Alternatively, the correction amount may be determined so as to change the position in the tooth width direction of the hob cutter T in the middle portion L2. Then, the correction amount is a value that depends on the axial direction position of the hob cutter T used for machining.

The control device 44 controls the driving device 45 based on the command value (NC program) and the result corrected by the correction processing unit 43. That is, the control device 44 controls the driving device 45 so as to reduce the tooth trace error of the workpiece W by correction.

It should be noted here that the correction processing unit 43 and the control device 44 may be built-in systems such as PLCs (Programmable Logic Controller) or CNCs (Computerized Numerical Control) devices, may be personal computers or servers, or may include microcomputers (processors) and storage devices so as to perform only control and processing.

The driving device 45 is a device that moves the tool spindle device 33 and the workpiece spindle device 23 relatively to each other. In this example, the driving device 45 includes a driving device that translationally drives the X-axis moving table 21, a driving device that rotationally drives the B-axis rotary table 22, a driving device that rotationally drives the workpiece W in the workpiece spindle device 23, a driving device that translationally drives the column 31, a driving device that translationally drives the saddle 32, and a driving device that rotationally drives the hob cutter T in the tool spindle device 33.

7. Gear Machining Method in the First Example

The gear machining method using the gear machining apparatus 1 in the first example will be described with reference to FIGS. 9, 10A, and 10B. In this example, trial machining is performed, the correction amount is determined using the measurement value obtained in the trial machining, and production machining is performed while making correction.

Figure 9:
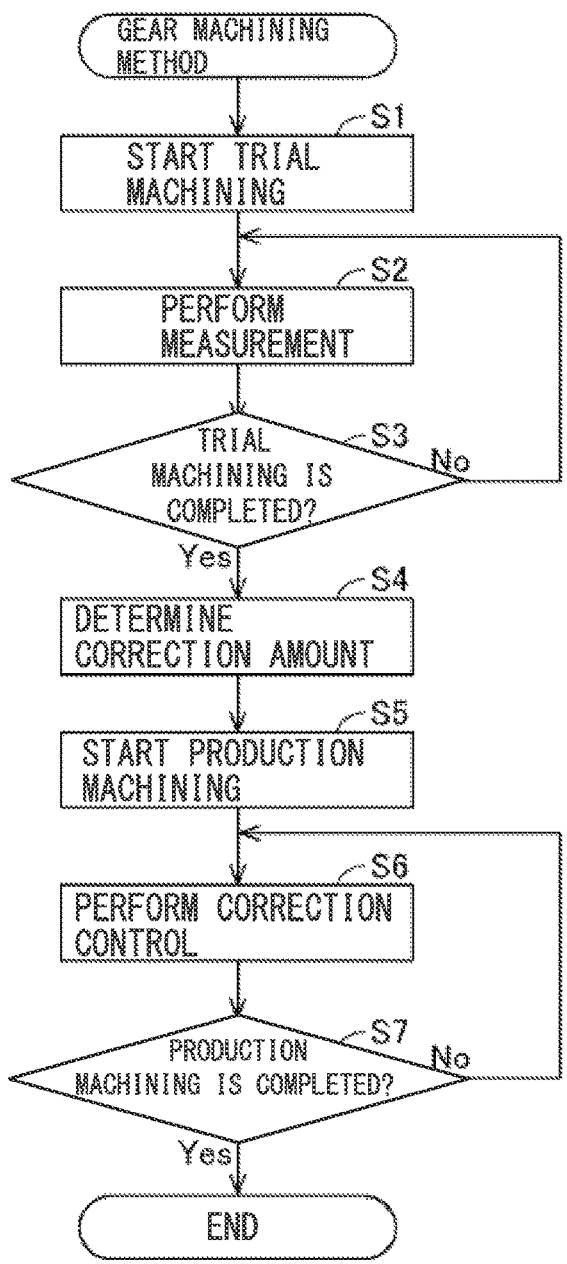
FIG. 9 is a flowchart illustrating a gear machining method in a first example.

As illustrated in FIG. 9, the control device 44 first starts trial machining (step S1). Trial machining represents the machining of a trial workpiece W. Next, the measuring device 41 performs measurement in the trial machining (step S2). Then, the measurement is continued until the trial machining is completed (No in step S3). When the trial machining is completed (Yes in S3), the correction processing unit 43 determines the correction amount based on the measurement value measured by the measuring device 41 in the trial machining (step S4). As described above, the correction amount may be determined using a pre-generated map or machine learning.

Next, the control device 44 starts production machining (step S5). Production machining is the machining of a production workpiece W, which is different from the trial workpiece W. The control device 44 performs correction control based on the correction amount in the production machining (step S6). Then, the correction control is continued until the production machining is completed (No in step S7). When the production machining is completed (Yes in S7), the processing ends.

Here, two types of correction methods will be given as examples. The first correction method corrects the cutting amount as illustrated in FIG. 10A. That is, the cutting amounts (cutting amounts in the Y-axis direction in this example) in the machining start end portion L1 and the machining completion end portion L3 in the tooth width direction of the workpiece W are made larger than the command values. In the middle portion L2 in the tooth width direction of the workpiece W, the cutting amount is the same as the command value.

Figure 10A:
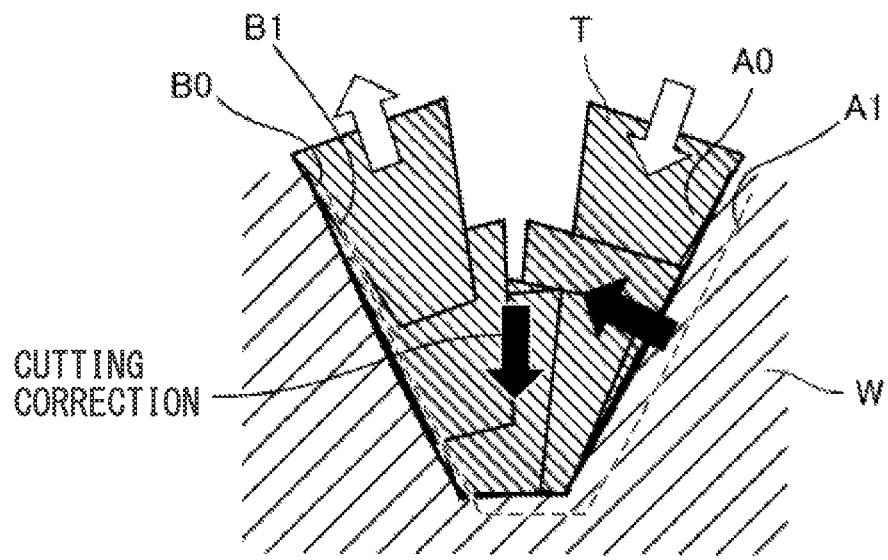
FIG. 10A is a diagram illustrating the track of the blade portion of the hob cutter on the workpiece in cutting correction.

In FIG. 10A, A1 and B1 represent the tooth surfaces to be machined by the corrected command value when the hob cutter T does not bend and vibrate. By correcting the cutting amount, the ideal tooth surfaces A0 and B0 can be formed even if the hob cutter T bends and vibrates due to the machining load generated in the machining start end portion L1 in the tooth width direction of the workpiece W.

Figure 10B:
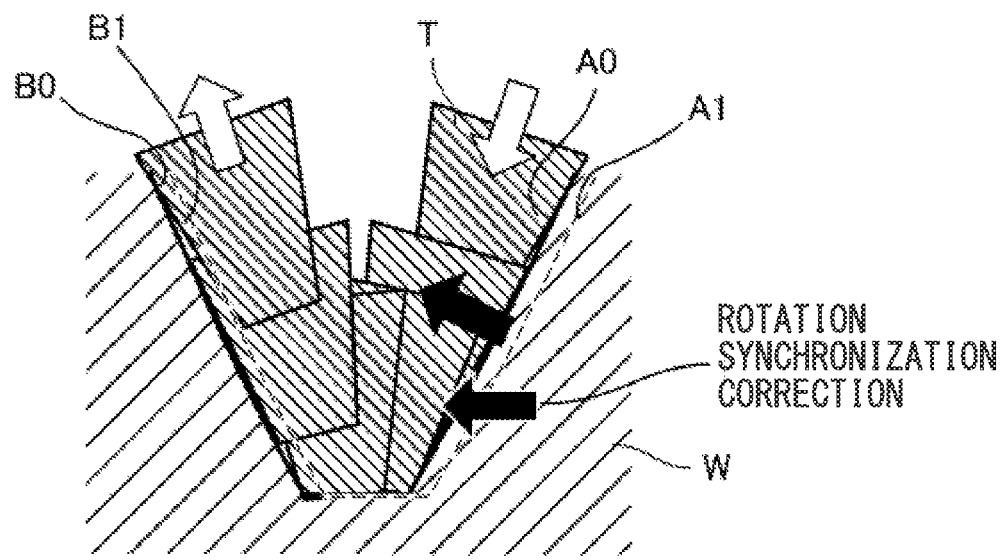
FIG. 10B is a diagram illustrating the track of the blade portion of the hob cutter on the workpiece in rotation synchronization correction.

In addition, the second correction method corrects the rotation synchronization of the workpiece spindle device 23 with respect to the tool spindle device 33, as illustrated in FIG. 10B. That is, in the tooth width direction of the workpiece W, the rotation synchronization shifts in the machining start end portion L1 and the machining completion end portion L3 are corrected. In FIG. 10B, A1 and B1 represent the tooth surfaces to be machined based on the corrected command value when the hob cutter T does not bend and vibrate. By correcting the rotation synchronization shift, the ideal tooth surfaces AO and BO can be formed even if the hob cutter T bends and vibrates due to the machining load generated in the machining start end portion L1 in the tooth width direction of the workpiece W.

As described above, when a cantilever-induced operation specific to the hob cutter T occurs, the correction processing unit 43 corrects the cutting amount or the rotation synchronization shift based on the value corresponding to the bending amount of the hob cutter T or the rotation synchronization shift measured by the measuring device 41. Accordingly, the tooth trace error caused by a cantilever-induced operation specific to the cantilever-supported hob cutter T can be reduced.

8. Gear Machining Method in the Second Example

The gear machining method in the second example using the gear machining apparatus 1 will be described with reference to FIG. 11. In this example, the correction amount is determined at the initial stage of production machining without performing trial machining and then the machining is performed while correction is made in the subsequent processing.

Figure 11:
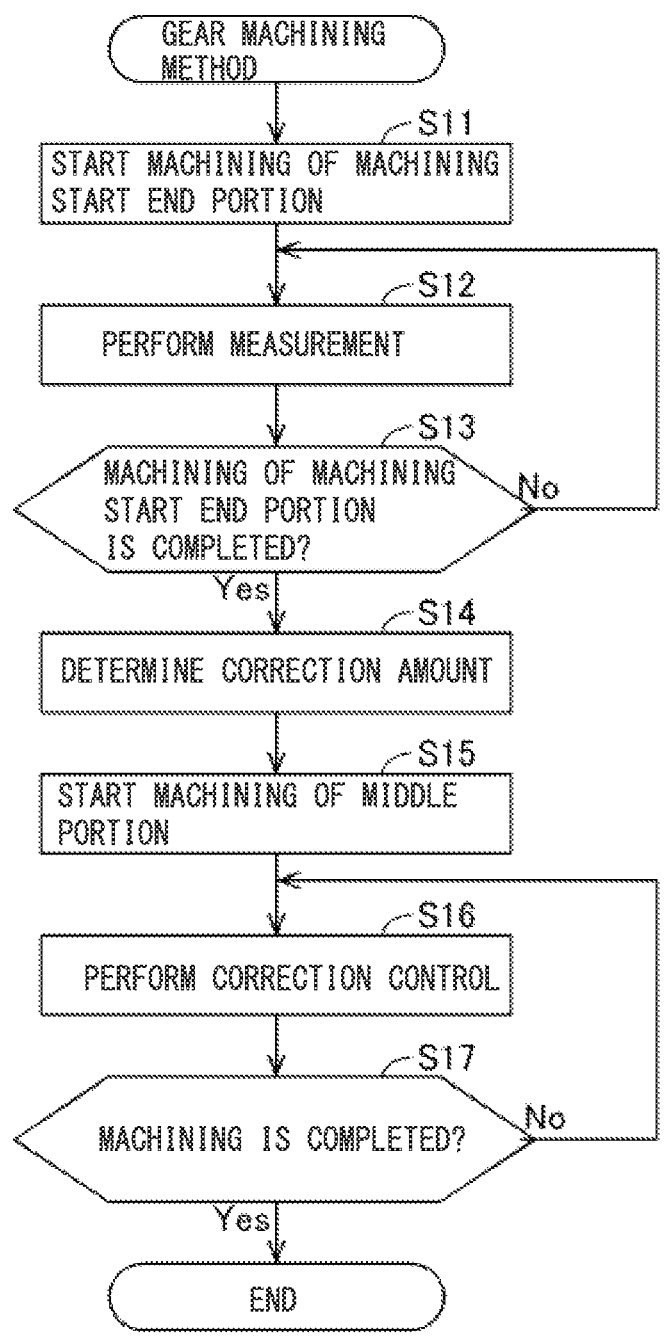
FIG. 11 is a flowchart illustrating a gear machining method in a second example.

As illustrated in FIG. 11, the control device 44 starts machining the machining start end portion L1 (illustrated in FIG. 3) of the workpiece W (production workpiece) (step S11). Next, the measuring device 41 performs measurement when the machining start end portion L1 of the workpiece W is machined (step S12). The measurement is continued until the machining start end portion L1 has been machined (No in step S13).

When the machining start end portion L1 has been machined (Yes in S13), the correction processing unit 43 determines the correction amount based on the measurement value measured by the measuring device 41 in machining the machining start end portion L1 (step S14). The two types described in the first correction method can be used to determine the correction amount.

Next, the machining of the middle portion L2 in the tooth width direction of the workpiece W is started (step S15). The control device 44 performs correction control based on the correction amount in the machining of the middle portion L2 (step S16). Then, the correction control is continued until the machining is completed, that is, until the machining completion end portion L3 of the workpiece W has been machined (No in step S17). When the machining is completed (Yes in S17), the processing ends.

When correction control is suddenly performed based on the correction amount at the timing of transition from the machining start end portion L1 to the middle portion L2 in the tooth width direction of the workpiece W, a step may be formed on the tooth surface of the workpiece W. Accordingly, immediately after the transition from non-correction control to correction control, the influence ratio of the correction amount is desirably increased gradually. As a result, the adverse effect of the starting of correction control can be suppressed.

As described above, the tooth trace error caused by a cantilever-induced operation specific to the cantilever-supported hob cutter T can be reduced. In addition, since trial machining is not required, the generation of a useless workpiece W can be prevented.

9. Gear Machining Method in the Third Example

Figure 12:
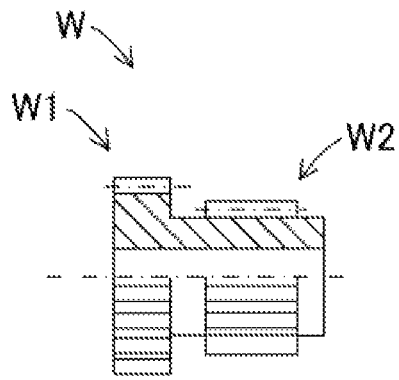
FIG. 12 is a diagram illustrating an example of a workpiece in a third example.

The gear machining method in the third example using the gear machining apparatus 1 will be described with reference to FIGS. 12 and 13. As illustrated in FIG. 12, in this example, the workpiece W has a large-diameter portion W1 and a small-diameter portion W2, and the generating machining of tooth profiles are performed on the large-diameter portion W1 and the small-diameter portion W2 using the gear machining method in the first example or the second example. That is, the workpiece W in this example is a stepped gear. Then, in this example, the measuring device 41 measures the tooth phases of the tooth generated in the large-diameter portion W1, which is the reference tooth profile subjected to finish machining, and the tooth generated in the small-diameter portion W2, which is the correction target tooth profile subjected to semi-finish machining, and the correction processing unit 43 calculates the correction amount for correcting the shift of the tooth phase in the finish machining of the small-diameter portion W2.

Figure 13:
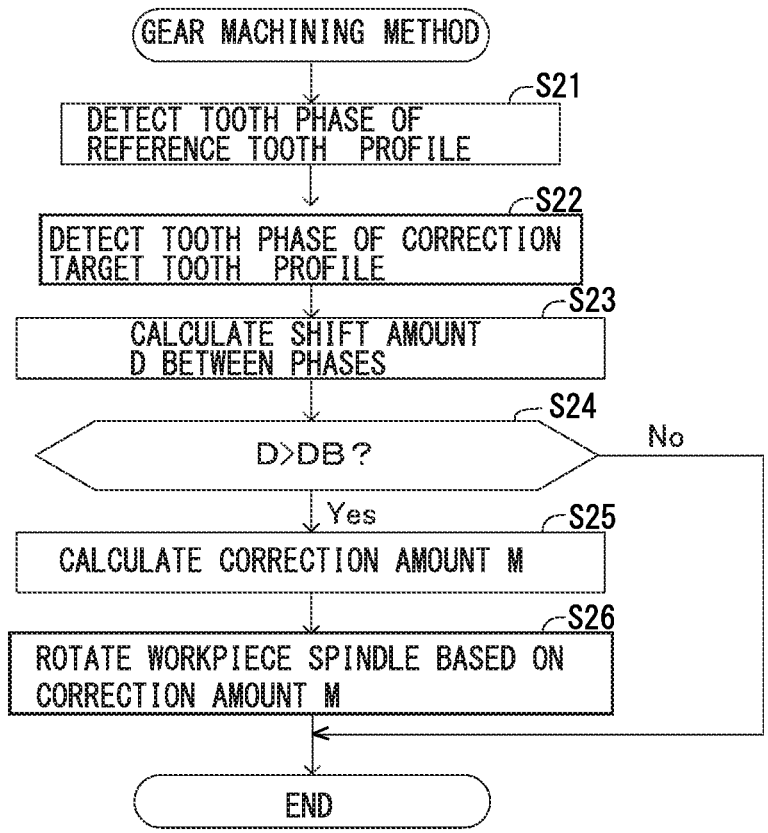
FIG. 13 is a flowchart illustrating a gear machining method in the third example.

As illustrated in FIG. 13, the measuring device 41 detects the tooth phase of the large-diameter portion W1, which is the reference tooth profile (step S21). Next, the measuring device 41 detects the tooth phase of the small-diameter portion W2, which is the correction target tooth profile (step S22). Next, the correction processing unit 43 calculates a shift amount D between the tooth phase of the large-diameter portion W1 and the tooth phase of the small-diameter portion W2 (step S23).

Next, the shift amount D calculated by the correction processing unit 43 is compared with a master shift amount DB stored in advance (step S24). When the shift amount D is smaller than the master shift amount DB (No in step S24), the phase difference between the large-diameter portion W1 and the small-diameter portion W2 falls within the allowable range, and the phase difference of the small-diameter portion W2 with respect to the large-diameter portion W1 does not need to be corrected.

In contrast, when the shift amount D is larger than the master shift amount DB (Yes instep S24), the phase difference between the large-diameter portion W1 and the small-diameter portion W2 falls outside the allowable range, and the phase difference of the small-diameter portion W2 with respect to the large-diameter portion W1 needs to be corrected. Accordingly, the correction processing unit 43 calculates a correction amount M for correcting the phase difference between the small-diameter portion W2 and the large-diameter portion W1 (step S25). Here, the correction processing unit 43 determines, for example, the difference between the shift amount D and the master shift amount DB as the correction amount M so that the shift amount D is equal to or less than the master shift amount DB.

Next, the control device 44 rotates the workpiece spindle device 23 based on the correction amount M (step S26). Here, the control device 44 rotates the workpiece spindle device 23 in the direction in which the shift amount D is reduced, based on the correction amount M.

In this way, the tooth trace error caused by a cantilever-induced operation specific to the cantilever-supported hob cutter T can be reduced. In addition, when the generating machining of a plurality of tooth profiles is performed on the workpiece W, the small-diameter portion W2 is subjected to finish machining finally with the tooth phase of the small-diameter portion W2, which is the correction target tooth profile, with respect to the tooth phase of the large-diameter portion W1, which is the reference tooth profile, corrected, so the machining accuracy of the work piece W can be improved.

What is claimed is:

1. A gear machining apparatus comprising:
a hob cutter machining a tooth profile on a workpiece;
a tool spindle device rotatably cantilever-supporting the hob cutter;
a workpiece spindle device rotatably supporting the workpiece;
a driving device moving the tool spindle device and the workpiece spindle device relatively to each other;
a measuring device measuring a value corresponding to a bending amount of the hob cutter or a rotation synchronization shift of the workpiece spindle device with respect to the tool spindle device or a tooth phase of the tooth profile of the workpiece; and
a correction processing unit correcting a cutting amount of the hob cutter or the rotation synchronization shift of the workpiece spindle device with respect to the tool spindle device based on the value measured by the measuring device,
wherein the measuring device measures, as the value corresponding to the bending amount of the hob cutter or the rotation synchronization shift of the workpiece spindle device with respect to the tool spindle device, a drive current of a rotary motor of the tool spindle device, a drive current of a rotary motor of the workpiece spindle device, and a rotation synchronization shift between the rotary motor of the tool spindle device and the rotary motor of the workpiece spindle device.

2. The gear machining apparatus according to claim 1, wherein the workpiece spindle device cantilever-supports the workpiece, and
generating machining of the tooth profile is performed on the workpiece with the hob cutter cantilever-supported and the workpiece cantilever-supported.

3. The gear machining apparatus according to claim 1, wherein the correction processing unit performs correction based on the value measured by the measuring device and an axial direction position of the hob cutter used for machining.

4. The gear machining apparatus according to claim 1, wherein the correction processing unit determines a correction amount based on the value measured by the measuring device when a trial workpiece is machined, and performs correction when a production workpiece different from the trial workpiece is machined based on the determined correction amount.

5. The gear machining apparatus according to claim 1, wherein the correction processing unit determines a correction amount based on the value measured by the measuring device when a machining start end portion in a tooth width direction of a production workpiece is machined, and performs correction when a middle portion in the tooth width direction of the production workpiece is machined based on the determined correction amount.

6. The gear machining apparatus according to claim 5, wherein the correction processing unit performs correction when the middle portion in the tooth width direction of the workpiece and a machining completion end portion of the workpiece are machined based on the determined correction amount.

7. The gear machining apparatus according to claim 1, wherein a plurality of tooth profiles are machined on the workpiece,
the measuring device sets a tooth profile subjected to finish machining among the plurality of tooth profiles to a reference tooth profile, sets a tooth profile subjected to semi-finish machining among the plurality of tooth profiles to a correction target tooth profile, and measures tooth phases of the reference tooth profile and the correction target tooth profile, and
the correction processing unit determines a correction amount based on a shift amount of the tooth phase of the correction target tooth profile with respect to the tooth phase of the reference tooth profile, and corrects a shift of the tooth phases when finishing machining of the correction target tooth profile is performed.

8. A gear machining apparatus comprising:
a hob cutter machining a tooth profile on a workpiece;
a tool spindle device rotatably cantilever-supporting the hob cutter;
a workpiece spindle device rotatably supporting the workpiece;
a driving device moving the tool spindle device and the workpiece spindle device relatively to each other;
a measuring device measuring a value corresponding to a bending amount of the hob cutter or a rotation synchronization shift of the workpiece spindle device with respect to the tool spindle device or a tooth phase of the tooth profile of the workpiece; and a correction processing unit correcting a cutting amount of the hob cutter or the rotation synchronization shift of the workpiece spindle device with respect to the tool spindle device based on the value measured by the measuring device, wherein the correction processing unit determines a correction amount based on the value measured by the measuring device when a machining start end portion in a tooth width direction of a production workpiece is machined, and performs correction when a middle portion in the tooth width direction of the production workpiece is machined based on the determined correction amount.

9. The gear machining apparatus according to claim 8, wherein the correction processing unit performs correction when the middle portion in the tooth width direction of the workpiece and a machining completion end portion of the workpiece are machined based on the determined correction amount.

10. A gear machining apparatus comprising:

a hob cutter machining a tooth profile on a workpiece;

a tool spindle device rotatably cantilever-supporting the hob cutter;

a workpiece spindle device rotatably supporting the workpiece;

a driving device moving the tool spindle device and the workpiece spindle device relatively to each other;

a measuring device measuring a value corresponding to a bending amount of the hob cutter or a rotation synchronization shift of the workpiece spindle device with respect to the tool spindle device or a tooth phase of the tooth profile of the workpiece; and a correction processing unit correcting a cutting amount of the hob cutter or the rotation synchronization shift of the workpiece spindle device with respect to the tool spindle device based on the value measured by the measuring device, wherein a plurality of tooth profiles are machined on the workpiece, the measuring device sets a tooth profile subjected to finish machining among the plurality of tooth profiles to a reference tooth profile, sets a tooth profile subjected to semi-finish machining among the plurality of tooth profiles to a correction target tooth profile, and measures tooth phases of the reference tooth profile and the correction target tooth profile, and the correction processing unit determines a correction amount based on a shift amount of the tooth phase of the correction target tooth profile with respect to the tooth phase of the reference tooth profile, and corrects a shift of the tooth phases when finishing machining of the correction target tooth profile is performed.

* * * * *